United States Patent [19]

Naruse et al.

[11] 4,136,362
[45] Jan. 23, 1979

[54] OPTICAL VIDEO PLAYBACK APPARATUS WITH TRACKING CONTROL AND TBC

[75] Inventors: Yohsuke Naruse, Tokyo; Masanobu Yamamoto, Yokohama; Mikio Sugiki, Tokyo, all of Japan

[73] Assignee: Sony Corporation, Tokyo, Japan

[21] Appl. No.: 797,140

[22] Filed: May 16, 1977

[30] Foreign Application Priority Data

May 20, 1976 [JP] Japan .................... 51-58307

[51] Int. Cl.² .................... H04N 5/76; G11B 21/10
[52] U.S. Cl. .................... 358/128; 179/100.3 V
[58] Field of Search .................... 358/128; 179/100.3 V; 250/201, 202; 340/173 LM, 173 LT; 365/120, 124, 121

[56] References Cited

U.S. PATENT DOCUMENTS

| 3,876,842 | 4/1975 | Bouwhuis | 179/100.3 V |
| 3,952,148 | 4/1976 | Laub | 179/100.3 V |
| 4,044,378 | 8/1977 | Laub | 179/100.3 V |

*Primary Examiner*—Raymond F. Cardillo, Jr.
*Attorney, Agent, or Firm*—Lewis H. Eslinger; Alvin Sinderbrand

[57] ABSTRACT

In apparatus for optically reproducing information signals from a record carrier, such as a video disc, and in which a light beam from a source, such as a laser is incident through an objective lens onto the surface of the record carrier and a tracking servo control is provided for adjusting the position of the incident light beam on the record carrier; a time base correction mirror operates on the light beams both incident onto, and reflected from the record carrier, and a tracking servo mirror operates only on the light beam incident onto the record carrier. A beam splitter and quarter wave plate are preferably positioned in the optical path between the tracking control mirror and the time base correction mirror. The apparatus may also include a lens with opposed spherical and cylindrical surfaces in the path of the reflected beam between the objective lens and a signal detection photodiode.

12 Claims, 10 Drawing Figures

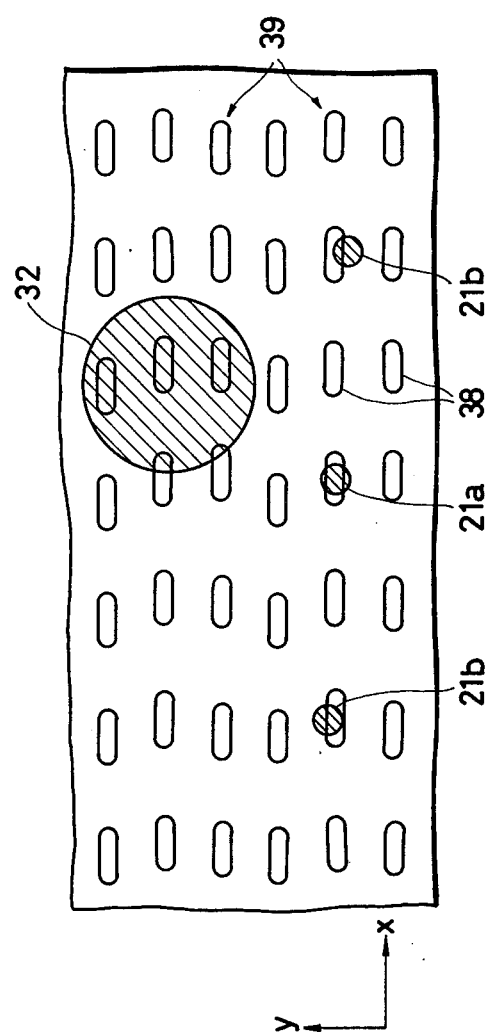

OPTICAL VIDEO PLAYBACK APPARATUS WITH TRACKING CONTROL AND TBC

BACKGROUND OF THE INVENTION

1. Field of the Invention

This invention relates to an apparatus for optically detecting information signals which are recorded on a record carrier, and more particularly an optical information signal detecting apparatus suitable for a optical video disc player with an optical system wherein light beams used for reading the information signals and for a tracking servo-control or a focus servo-control, respectively, are incident on a signal record surface of a record carrier having a signal record track formed thereon, and the detection of the recorded signals and the tracking servo-control or the focus servo-control are effected by the use of reflected light beams from the signal record surface.

2. Description of the Prior Art

In the conventional optical video disc, the center of rotation of a master disc during a signal recording operation or a cutting operation does not usually accord with the center of rotation of a video disc manufactured from the master disc for use in signal reproduction during a reproducing operation or a reading or playback operation for recorded signals. For this reason, when the video disc used for the signal reproduction is rotated to read or playback the recorded signals in a video disc player, its movement is somewhat eccentric and, consequently, each given portion of a record track to be read appears to move in a complex path rather than a simple circle. Such movement results in a displacement of the record track from a predetermined position, so that the recorded information signals cannot be accurately read. In order to compensate for the eccentric movement of the disc, it has been proposed in the conventional video disc player to provide a time base correction (TBC) mirror disposed in an optical path of a light beam passing through an objective lens so as to operate in cooperation with a tracking control mirror.

That is to say, a focussing point or a beam spot of an incident light beam formed on the surface of the disc by the objective lens is moved in the forward direction along the record track by the TBC mirror, and is moved in the radial direction of the disc by the tracking mirror, so that the beam spot moves on the surface of the disc in both radial and tangential directions in response to the eccentric movement of the disc. As a result, the recorded information signals can be accurately read despite the eccentric movement of the record track. However, the particular positional arrangement of the TBC mirror and the tracking control mirror and the compatibility of these mirrors with a focus servo-control system has not been previously set forth. Thus it has been necessary to provide a new system in which the servo-control by the TBC mirror can be optically performed without disturbing the functions of the tracking servo-control system and the focus servo-control system.

Incident light beams on the disc comprise, in general, a beam for reading the information signals and two beams for the tracking servo-control locating at the both sides of the former beam. These three beams form the respective spots on the disc along the record track after passing through the objective lens to be reflected from the record track and then pass through the objective lens again to reach a photo-detector comprising photo-diodes or the like. The beam spots of the reflected beams formed on the photo-detector are dot-like or circular and are continually moved following the movement of the tracking mirror. Thus the output from the light-receiving surface of the photo-detector which must have relatively large surface area, does not have a uniform level. Also, the signal-to-noise ratio of reproduced signals is degraded because of the sensitivity of the photo-detector to stray light leaking from the outside.

The light beams for reading the information signals, such as the tracking servo-control and the focus servo-control are usually obtained from a single light source, such as a laser device. These beams may be separated respectively from a single light beam. In conventional apparatus, such separation is performed by an ordinary beam splitter and the plural beams are merely spatially split. Accordingly, the respective split beams after reflection on the disc are positioned closely to each other. Such spatial split of the beam requires the increased accuracy in the position and direction of the beam splitter, and it is very difficult to arrange the apparatus as a compact unit. Considerable stray light from the beams is caused when the single beam is split into the plural beams by the beam splitter and there is a concomitant loss in the intensity of the light beam.

SUMMARY OF THE INVENTION

An object of this invention is to provide an apparatus for optically detecting information signals wherein a servo-control operation using a TBC mirror operates without disturbing the functions of a tracking servo-control system.

Another object of this invention is to provide an apparatus for optically detecting information signals wherein the detected information signals and tracking servo-control signals are accurately obtained without significant signal loss.

A further object of this invention is to provide an apparatus for optically detecting information signals wherein a servo-control operation using a TBC mirror can be effected without disturbing the functions of a tracking servo-control system and a focus servo-control system, and beams for servo-control can be precisely separated without spatial restriction.

In accordance with an aspect of this invention, in an apparatus for optically reproducing information signals recorded on a video disc and reproduced by means of a light beam produced by a light beam source, such as a He-Ne laser, and following in the optical path through an objective lens onto and then reflected from, information signals recorded on the disc, and which has a tracking servo control mechanism for adjusting the incident light beam so as to follow the path of the recorded signals, a time base correction (TBC) mirror and a tracking control servo mirror are provided disposed in an optical path passing through the objective lens so that the time base correction mirror operates on the beam both in the portion of the optical path from the laser incident onto the disc, and in the portion thereof reflected from the disc, and the tracking servo mirror is disposed between the laser and the TBC mirror, so that the tracking servo mirror operates on the beam only in that portion of the path from the laser incident onto the disc. Preferably, a second lens and a photo-detector are included on the portion of the beam path reflected from the disc. The second lens has different focal distances in the X-direction (the direction along the record track on the disc) and in the Y-direction (the direction perpendicular to both the optic axis of the lens and the X-direction), and is disposed on the optical path of the reflected light beam. The photo-detector is disposed following the second lens to receive the reflected light beam passing through the latter. The following relation is substantially established between the lens and the photo-detector:

$$1/ax + 1/bx = 1/fx$$

$$1/ay + 1/bx = 1/fy$$

, where ax is the distance between a plane on which focal points of the reflected light beam are formed by the objective lens and the second lens, bx is the distance between the second lens and the signal detecting element, ay is the distance between the second lens and a deflection center at which the reflected beam intersect the optical axis of the second lens after passing through the objective lens, fx the focal length of the second lens in the x-direction, fy is the focal length of the second lens in the y-direction, and fx is not equal to fy. In a preferred mode of the invention, a beam-splitter provides light beams for reading the information signals and for the tracking servo-control as a first polarized beam in a first polarization plane. A second polarized beam in a second polarization plane can be used in conjunction with a focus servo-control system. The first polarized beams pass through polarization-system. The means and the TBC mirror on the plane rotating and reflected paths thereof and the tracking control mirror only on the incident path. The second polarized beam passes through the polarization-plane rotating means and the TBC mirror on the incident and reflected paths thereof and in an optical path separated somewhat from the optical path of the first polarized beam. The second polarized signal is then provided to a signal detecting element for focus servo-control.

The above and other objects, features and advantages of this invention will be apparent from the following detailed description of illustrative embodiment shown in the accompanying drawings.

BRIEF DESCRIPTION OF THE DRAWINGS

FIG. 10 is a view of a portion of a recording disc.

DESCRIPTION OF THE PREFERRED EMBODIMENTS

Figure 1:
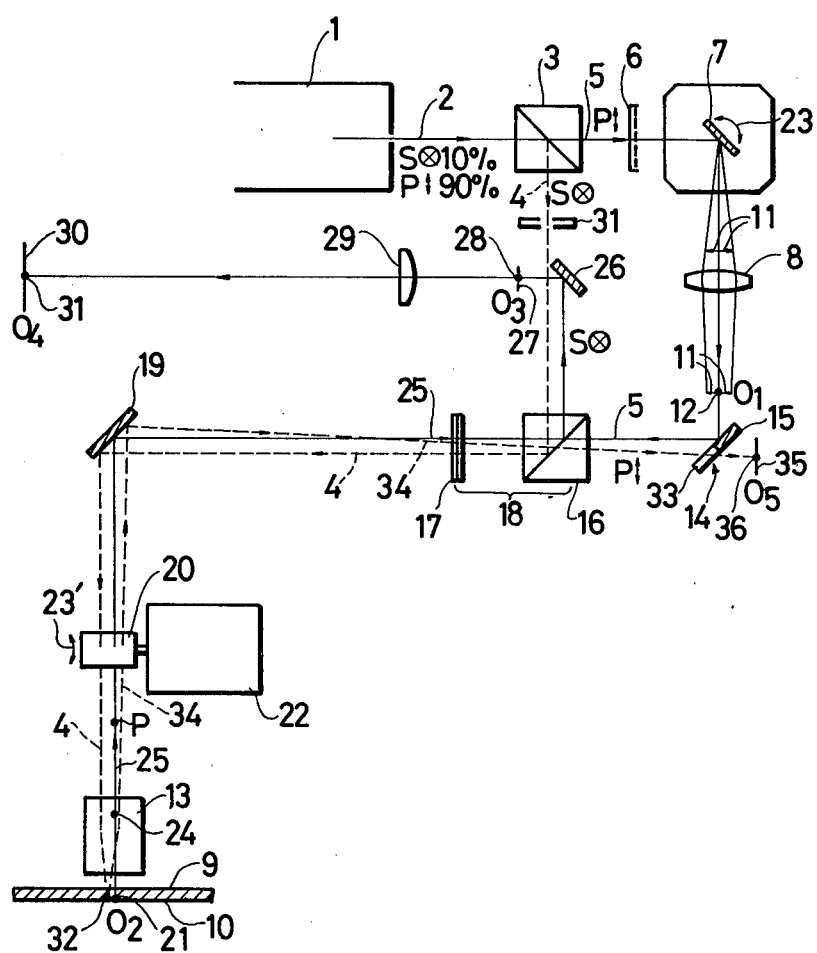
FIG. 1 is an overall schematic view showing the apparatus for optically detecting information signals, according to the present invention.

One embodiment of this invention will be described with reference to the drawings, which will be applied to an optical video disc player.

Initially, the construction of an optical system of an embodiment of the present invention will be now described with reference to FIG. 1.

A linearly polarized He-Ne laser light source 1 is oriented around its optical axis so that a laser beam 2 obtained therefrom contains 10% of a first polarization component in the perpendicular direction to the surface of the drawing paper as shown by mark:⊗(hereafter called "S-direction") and 90% of a second polarization component in the parallel direction to the surface of the drawing paper as shown by mark: ↕ (hereafter called "p-direction").

The beam 2 is incident on a polarized beam splitter 3. A laser beam 4 consisting of the polarization component of the s-direction is reflected by the beam splitter 3 in the right-angular direction and a laser beam 5 consisting of the polarization component of the p-direction permeates therethrough. A reflection surface of the beam splitter 3 is formed by multiple deposit films of dielectrics. The attenuation rates on the reflection of the s-direction polarized beam 4 and on the permeation of the p-direction polarized beam 5 are less than 1% respectively.

The beam 2 is split by the beam splitter 3 into the beams 4 and 5 different from each other in the polarization directions. The beam 5 is used as a reproducing, or read beam for reading the information signals. The beam 5 is incident on a diffraction grating 6 where it is divided into three beams: one laser beam for reading the information signals and two laser beams for the tracking servo-control. Only one laser beam is shown in FIG. 1 for simplicity of illustration. The beam 5 permeating through the diffraction grating 6 is then incident on a tracking mirror 7 and reflected there before being incident on a intermediate lens 8. The tracking mirror 7 is continually swung in the direction shown by arrow 23 for the tracking servo-control to be effected corresponding to the change in the direction of reflected beams from a signal record surface 10 of a video disc 9, so that the beam 5 reflected by the tracking control mirror 7 is swung as shown by arrow 11.

The beam 5 forms a spot 12 through the intermediate lens 8 on a surface $O_1$ located at a position corresponding to a focal distance of the intermediate lens 8. However, the spot is also continually swung in the direction shown by the arrow 11. The intermediate lens 8 focuses the light from a spot on the tracking mirror substantially at a point 24 on a main plane locating at the laser light source side of an objective lens 13 which is disposed close to the video disc 9. The beam 5 is further reflected by a light-reflective portion 15 of a knife-edged mirror 14 to a polarized beam splitter 16. The beam splitter 16 can have the same construction as that of the beam splitter 3. Accordingly, the beam 5, which is the p-direction polarized component, posses undeflected through the beam splitter 16 and then reaches a quarter-wave plate 17.

The beam splitter 16 and the quarter-wave plate 17 form a substantial optical coupler 18 where light beams containing different polarized components are separated into the respective polarized components and are shifted in polarization phase. When the beam 5 from the beam splitter 16 passes through through the quarter-wave plate 17, the part of the beam polarized in one direction will lag the part of the beam polarized in the other direction by a phase difference of 1/4 wave length. As a result, a circularly polarized beam 5 is directed to a mirror 19.

The beam 5 reflected by the mirror 19 is further reflected by a time base correction (TBC) mirror 20 and then is focussed through the objective lens 13 to form a spot 21 on plane $O_2$ of a signal record surface 10 of the video disc 9.

The TBC mirror is constructed in the conventional way, that is to say, it is attached to a driver 22 such as a galvano motor so as to be rotated in the direction shown by arrow 23' in order that the spot 21 of the beam 5 is moved in the direction along the record track of the video disc 9 to effect the time base correction. A focus servo-control for the objective lens 13 is achieved as described below and the distance between the objective lens 13 and the video disc 9 is varied by a moving coil or the like.

The beam 5 reflected by the signal record surface 10 of the video disc 9 is modulated in response to a row of pits formed in the record track corresponding to recorded signals. Thus modulated and reflected beam 25 passes through the objective lens 13 and then is reflected again by the TBC mirror 20. The beam 25 is further reflected by the mirror 19 and then passes through quarter-wave plate 17 a second time. Again the part of the beam 5 polarized in one direction suffers a lag of ¼ wavelength behind the part of the beam polarized in the other direction. Circularly polarized beam 25 is thus shifted in polarization phase by ¼ wavelength to become again linearly polarized. Accordingly, the unmodulated beam 5 first passes through the quarter-wave plate 17 and is then modulated by the video disc 9 and further passes through the quarter-wave plate 17 again as the reflected beam 25. In other words, the beam 5 passes through the quarter-wave plate 17 twice or once on each of the incident and reflected portions of the path thereof, so that the incident beam 5 (p-direction polarized) is shifted in polarization phase by a phase difference of a half wave length (½λ) and the reflected beam 25 has only the s-direction polarized component.

The reflected beam 25 is reflected by the reflective surface of the beam splitter 16 which reflects selectively a beam of the s-direction polarized component, to be directed to the mirror 26. The beam 25 is further reflected by the mirror 26 and forms a spot 28 on a plane $O_3$. The spot 28 is swung only in the direction shown by an arrow 27 as discussed hereafter, in correspondence with the above-mentioned swinging of the tracking mirror 7. The reflected beam 25 further passes through lens 29 and is incident on a photo-detector 30 comprising three elements disposed on a plane $O_4$ to form a spot 31 thereon. As a result, the photo-detector 30 converts the information contained in the reflected beam 25 into electrical signals as reproduced information signals and an electrical signal used for the tracking servo-control. The positional relation between the lens 29 and the photo-detector 30, and their constructions will be described in detail below.

Another laser beam 4 which is s-direction polarized, which has been separated from the beam 2 by the beam splitter 3, first passes through a pin hole 31 to be reduced in the beam diameter. The beam 4 is directed to the beam splitter 16 and is reflected there, then reaches the ¼λ plate 17 on an optical path separated somewhat from the optical axis of the beam 5. As described above, the beam 4 is linearly polarized by a phase difference of ¼ wave length suffered as beam 34 passes through the quarter-wave plate 17. As a result, the circularly polarized beam 4 is led to the signal record surface 10 of the video disc 9 through the mirror 19, the TBC mirror 20 and the objective lens 13 on an optical path distant from the optical axis of the beam 5. The beam 4 is focussed to form a spot 32 on the signal record surface 10. The beam 4 is modulated thereby and is directed to the quarter-wave plate 17 again as a reflected beam 34 through the objective lens 13, the TBC mirror 20 and the mirror 19. When the reflected beam 34 passes through the quarter-wave plate 17, it is further shifted in polarization phase by a phase difference of ¼ wave length. Accordingly, the beam 4 passes twice through the quarter-wave plate 17 and is shifted in polarization phase by a phase difference of a half wave length. Consequently, the beam 4 becomes p-direction polarized. The polarized beam 34 permeates the beam splitter 16 and then passes through a light-transmissible portion 33 of the knife-edged mirror 14. The beam 34 reaches a photo-detector 35 disposed on a plane $O_5$ to form a spot 36 thereon. The photo-detector 35 converts the information contained in the beam 34 into electric signals which are used to move the objective lens 13 so that the focus servo-control is effected.

The spot 32 of the beam 4 and the spot 21 of the beam 5 are formed side by side on the signal record surface 10 and the spot 32 is subject to the time base correction by the TBC mirror 20. The spot 32 is much larger than the spot 21. That is, the spot 32 has a diameter of, for example, about 6 microns and the spot 21 has a diameter of, for example, about 1 micron. This larger spot 32 assures that the spot 32 detects only beam defocussing without being influenced by the tracking servo-control signal.

In FIG. 1, the path from the laser light source 1 to the TBC mirror 20 is shown as a plane view, and the objective lens 13 and the disc 9 are illustrated in a side view.

The function of the above described video disc player and its associated the optical system will be now explained.

1. Behaviour of Incident Beam and Reflected Beam

First, the behaviour of the reflected beam 25 in the case that the beam 5 passes through the TBC mirror 20 both on the incident and reflected pathways thereof will be explained.

Figure 2:
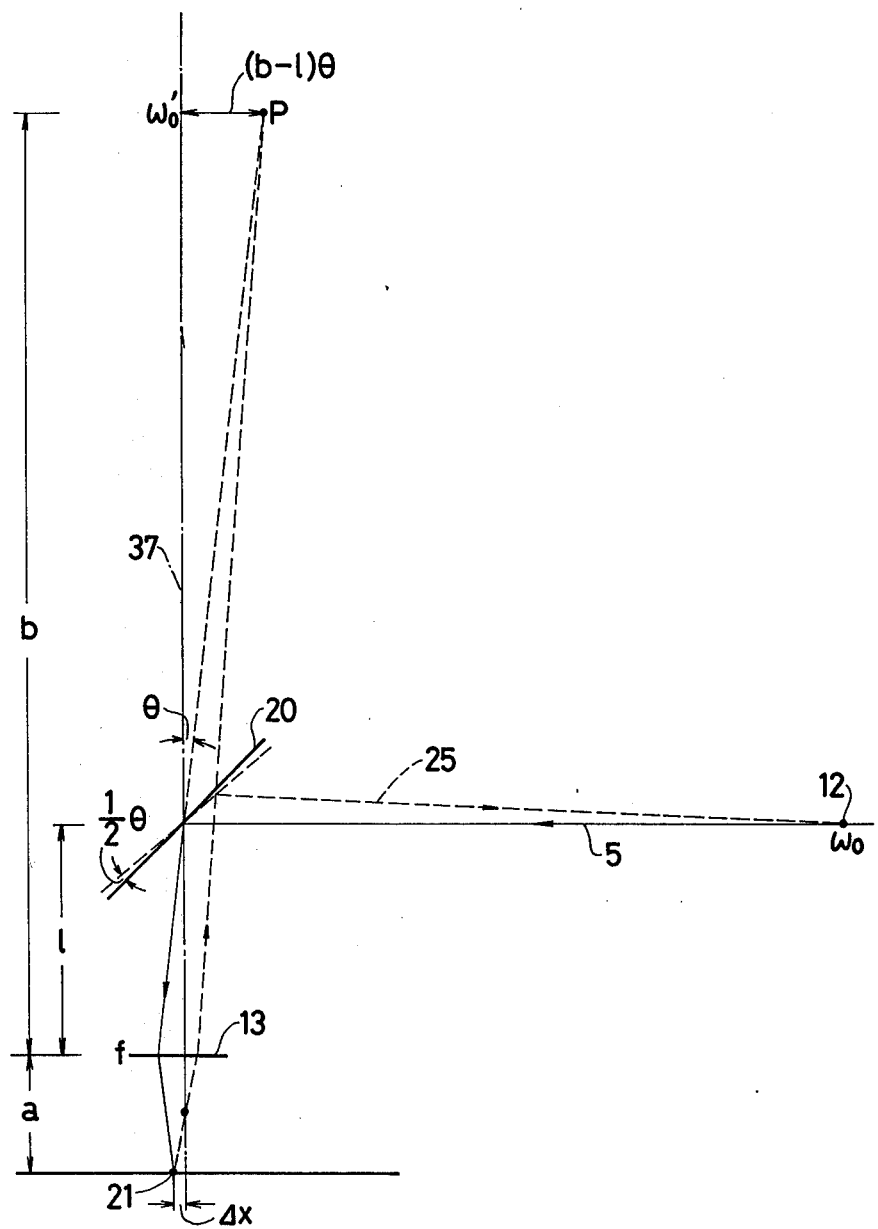
FIG. 2 is a schematic drawing of the optical paths of the beams used in the apparatus of FIG. 1.

FIG. 2 shows schematically optical paths of each beam. When the beam 5 advancing from a point $\omega_o$ on the plane $O_1$, which corresponds to the spot 12, to the TBC mirror 20 is reflected by the TBC mirror 20, it is assumed that the TBC mirror 20 is swung by an angle ½θ. The beam 5 is reflected in the direction shown in the drawing and then is incident on the objective lens 13 to form the spot 21 on the recorded surface 10 of the video disc. The beam 5 is further reflected by the surface 10 and then passes through the objective lens 13 as the reflected beam 25. The beam 25 is reflected by the TBC mirror 20 and makes its spot at the point $\omega_o$.

This operation will be explained herein in detail. It is assumed that the beam 5 forms the spot 21 at a position separated from an optical axis 37 by a distance Δx in the direction of the record track of the disc in such a manner that the optical axis 37, which is the optical pathway when the TBC mirror 20 is not swung, is used as a standard. The spot 21 can be regarded as a spot which is made by a beam emitted from a point P as a light source. The point P is located on a plane perpendicular to the optical axis 37 and including a point $\omega_o'$ distant on the optical axis 37 from the TBC mirror 20 by the same distance as the point $\omega_o$, because the point P and the point $\omega_o'$ are image-inversely symmetrical. The distance between the point $\omega_o'$ and the TBC mirror 20 is represented as (b − l) where a distance l is the distance from the TBC mirror 20 to the objective lens 13 and a distance b is the distance from the point $\omega_o'$ to the objective lens 13. A distance from the point $\omega_o'$ to the point P is represented substantially as (b − l)·θ. Since the beam from the point P forms the spot 21 through the objective lens 13 having a magnification β, the formula represented by $\Delta x = \beta(b - l)\theta$ is established. Accordingly the spot 21 of the beam 5 is shifted from the optical axis 37 by the distance $\Delta x$ or $\beta(b - l)\theta$ in the direction along the record track of the disc by the swinging of the TBC mirror 20.

However, since the beam 5 is operated upon by the TBC mirror 20 both on the incident and reflected path portions thereof, the spot of the reflected beam 25 is formed at the point $\omega_o$. Therefore the spot 28 (FIG. 1) formed on the point $\omega_o$ on the plane $O_3$ (conjugate with the plane $O_1$ with regard to the mirror 16), as shown in FIG. 1 is fixed spatially and does not move in the direction along the record track. For this reason, a time base correction corresponding to $\Delta x$ is effected for the spot 28 on the plane $O_3$ in such a manner that the location of the spot 28 is independent of the swinging of the TBC mirror 20.

Figure 3:
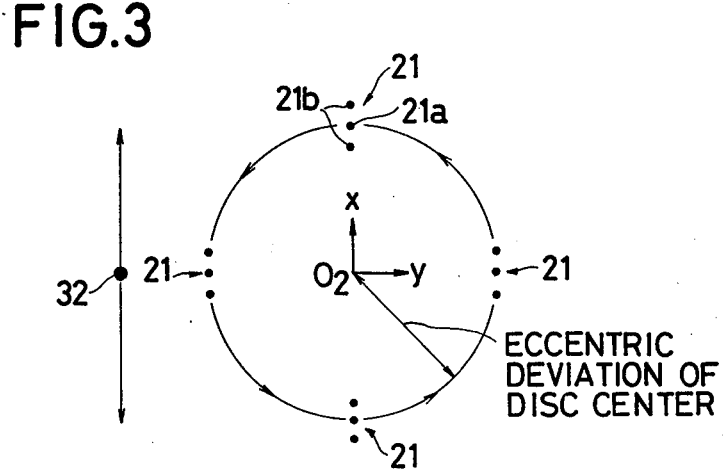
FIG. 3 is a diagram showing the behavior of the beams of light incident on a recording disc according to the present invention.

The behaviour of the spot 21 on the signal record surface 10 of the disc 9 is shown in FIG. 3. The spot 21 comprises a spot 21a of the light beam for reading the information signals, and two spots 21b of the light beams for the tracking servo-control formed at both sides of the spot 21a. These spots 21a and 21b are shifted by the swinging of the TBC mirror 20 as set forth above in the x-direction or the direction along the record track, and are shifted also by the swinging of the tracking mirror 7 in the y-direction or the radial direction of the disc, so that the spots 21a and 21b make a circular movement as shown in the drawing. Accordingly, the spot 21 can be moved following the eccentric movement of the disc 9 to exactly form the spot 21 along the record track. Further unevenness in the rotation of the disc can be also prevented by the TBC mirror 20, in a manner which is not herein described. The above-mentioned spot 32 of the beam 4 is also formed on the signal record surface 10. Since the beam 4 does not pass the tracking mirror 7, the spot 32 is shifted only in the x-direction by the swinging of the TBC mirror 20 as shown in FIG. 3. The size of the spot 32 is so large that the signals can be sufficiently detected even if the tracking servo-control is not effected.

Figure 4:
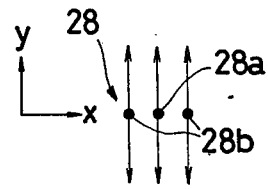
FIG. 4 is a diagram showing the behavior of the beams of light incident on a photo-detector according to the present invention.

The spot 21 makes the circular movement as shown in FIG. 3, however, the spot 28 on the plane $O_3$ corresponding to the spots 21a and 21b is not shifted in the x-direction. As a result, the spot 28 comprising spots 28a and 28b is shifted only in the y-direction as shown in FIG. 4. In other words, if it is assumed that in FIG. 2, the beam 5 is not operated on by TBC mirror 20 on both the incident and reflected path thereof, the point $\omega_o$ is influenced by the swinging of the TBC mirror 20, so that the spot 28 on the plane $O_3$ is shifted by (b − l)θ in the x-direction. The beam 5, however, in fact is operated on by the TBC mirror 20 on the incident and reflected path portions thereof. Accordingly, the swinging of the spot 28 being represented as (b − l)θ does not occur as described above, and the spot 28 is fixed in x-direction and is shifted only in the y-direction.

As apparent from the above description, in the apparatus according to this embodiment, the TBC mirror 20 is so disposed near the objective lens 13 on the optical path of the light beams passing through the objective lens 13 back and forth and the tracking mirror 7 is disposed near the laser light source 1 so that the beam 5 is operated on by the TBC mirror 20 on the incident and reflected path portions thereof, and by the tracking control mirror 7 only on the incident path portion thereof. Accordingly, when the photo-detector is disposed on the plane $O_3$, the information signals by the beam for the reading and the tracking signal by the beam for the tracking servo-control can be obtained, and servo-control by the TBC mirror 20 and servo-control by the tracking mirror 7 can be made compatible with each other without adverse influence on each other. The beams 5 and 4 can be precisely separated in the incident and reflected path portion thereof by the use of the optical coupler 18. These separated beams can be used as independent beams for reading the information signals and for the focus servo-control, respectively without spatial restriction. Since the incident beam 4 and the reflected beam 25 can be separated by the mirror 26 by utilizing the difference between the positions through which the both beams pass, respectively, the return of the reflected beam 25 to the laser light source, which might cause the undesirable oscillation of the laser beam, can be prevented and the utilization rate of the laser power can be maximized.

In this embodiment, the beam 4 for the focus servo-control is not necessary in principle and it is sufficient to use only the light beams for reading the information signals and for the tracking servo-control. Therefore, the beam splitter 3 and the optical coupler 18 need not be necessarily used. Other modifications are possible, for example, light-reflective grooves are formed in the tracking mirror 7 and such a modified tracking mirror 7 can be used as a light-reflective type diffraction grating instead of providing the above described diffraction grating 6.

2. Detecting of Information Signal and Tracking Signal

In the above described embodiment, the photo-detector comprising the three elements is disposed on the plane $O_3$. In this case, the beam 5 passes the tracking mirror 7 only on the incident path portion thereof and therefore the spots 28a and 28b move in the y-direction on the photo-detector synchronously with the swinging of the tracking mirror 7, as shown in FIG. 4. As a result, though a cross-talk problem does not occur, the inherent unevenness in photosensitivity of the light-receiving surface of the photo-detector coupled with errors in the positional arrangement of the photo-detector causes errors in the reproduced signal.

To avoid the foregoing disadvantages, a specially designed lens is further disposed between the plane $O_3$ and the photo-detector 30 in this embodiment as shown in FIGS. 5-8.

Figure 5:
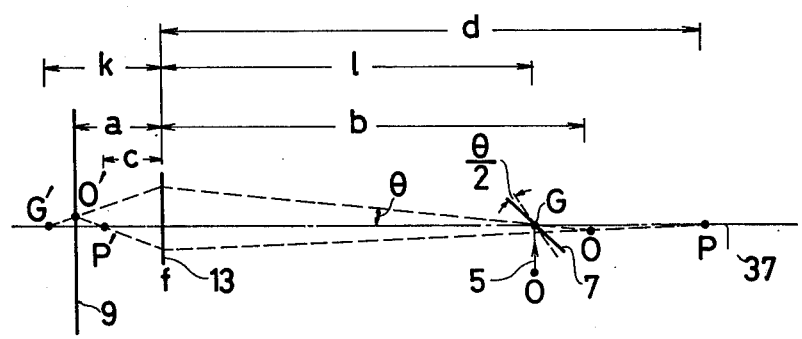
FIG. 5 is a schematic drawing of an optical path for explaining the operation of the present invention.

The behaviour of the beam 5 as it is operated on by the tracking mirror 7 only on the incident path portion thereof, will be explained with reference to FIG. 5.

It is assumed that the tracking mirror 7 is swung by an angle of ½θ when the beam 5 from a light source O existing at the above described plane $O_1$ is reflected by the tracking mirror 7. The beam 5 is incident on the objective lens 13 at an angle θ against the optical axis 37 and forms a spot on a point O' on the disc 9. The beam 5 is then reflected by the disc 9 as the reflected beam 25. The reflected beam 25 intersects the optical axis 37 at a point P' and is incident on the objective lens 13 to form a spot at a point P at which the reflected beam 25 intersects again the optical axis 37. The point P is a deflection center of the reflected beam 25.

The position of the deflection center P can be easily calculated when the disc 9, the objective lens 13 and the tracking mirror 7 are arranged in a relationship shown in the drawing. Because the light source O and the spot O' on the disc 9 are conjugate with each other with regard to the objective lens 13, the following formula is established:

$$1/a + 1/b = 1/f$$

$$\beta = a/b$$

, when f is the focal length of the objective lens.

An image at a point G on the tracking mirror 7 is formed on a point G' and following relationship is obtained:

$$1/k + 1/l = 1/f$$

The point P' and the point G' are image-reversely symmetrical with each other through the disc 9 and the following relationship is established:

$$c = a - (k - a) = 2a - k$$

Since the image at the point P' is formed at the point P, the following formula is established:

$$1/c + 1/d = 1/f$$

The deflection angle $\theta$ by the tracking mirror 7 is not a variable in the above mentioned formulas and therefore the position of the point P is kept constant independently on the deflection angle $\theta$.

When a distance d from the objective lens 13 to the point P is calculated according to the above formulas, it is represented by the following relation:

$$d = \frac{cf}{c-f} = \frac{(2a-k)f}{2a-k-f},$$

and $a = \beta b$, $$f = \frac{\beta b}{\beta + 1} \text{ and } k = \frac{lf}{l-f} = \frac{\beta lb}{(\beta+1)l - \beta b}$$

are substituted into the formula, so that the distance d is represented by $$d = \frac{l - 2\beta(b-l)}{2l - b - 2\beta(b-l)} \times b.$$

The position of the deflection center P can be calculated by applying the foregoing equation.

Figure 6:
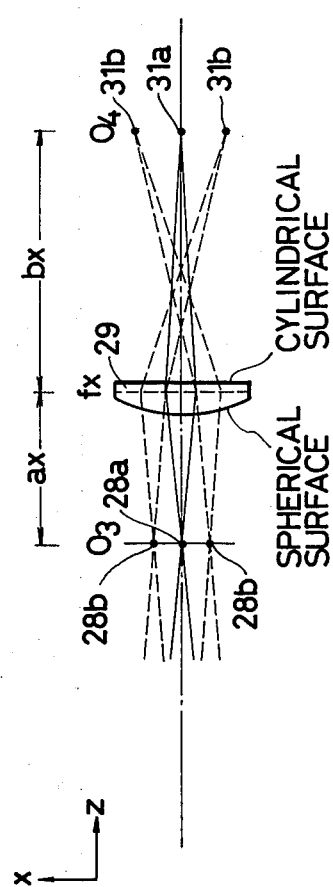
FIGS. 6 and 7 are sectional views showing a spherico-cylindrical lens used in the present invention.
Figure 7:
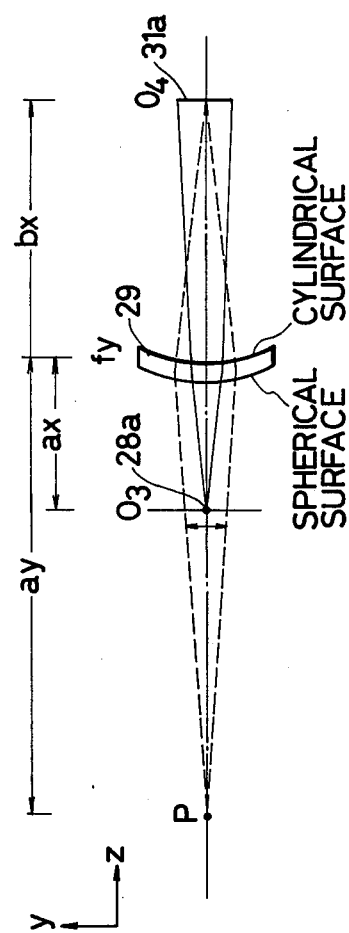

According to this embodiment, the lens 29 is disposed at the position which is distant by length ay from the deflection center P of the swinging of the spot caused by the swinging of the tracking mirror, and distant by length ax from the surface $O_3$, as shown in FIGS. 6 and 7, and the photo-detector 30 comprising three elements is disposed at the position (a plane $O_4$) distant by length bx from the lens 29.

The lens 29 has a focal distance fx in the x-direction and a focal distance fy in the y-direction which are different from each other. To achieve this, the lens 29 has a cylindrical surface at one side and a spherical surface at another side. The following relation is substantially established:

$$1/ax + 1/bx = 1/fx \; (Mx = bx/ax)$$

$$1/ay + 1/bx = 1/fy$$

As a result, the spots 28a and 28b formed on the plane $O_3$ form three spots 31a and 31b on the plane $O_4$ of the photo-detector 30 through the lens 29 as shown in FIG. 6. On the other hand, the spot 28a swinging in the y-direction on the plane $O_3$ forms an elongated spot 31a in the y-direction on the plane $O_4$ of the photo-detector 30 as shown in FIG. 7 and the spots 28b form elongated stationary spots 31b in the y-direction on the plane $O_4$.

Figure 8:
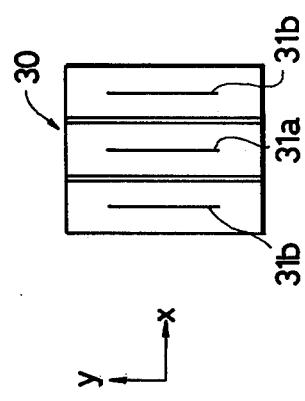
FIG. 8 is a diagram showing the behavior of the beams of light incident on the photo detector of the present invention.

FIG. 8 illustrates the foregoing relation of spots 31a and 31b with respect to photodetector 30. Since the three elongated stationary spots 31a and 31b are formed in the y-directon, the unevenness in the surface of the photo-detector 30 does not affect an output signal therefrom. The spots 31a and 31b are small enough that any decrease of signal-to-noise ratio caused by the interference by leakage of light from the outside can be avoided and that the photo-detector comprising multiple elements can be easily aligned. Further the photo-detector 30 is disposed on the plane $O_4$ which is conjugate with the plane $O_3$ with regard to the lens 29, so that the three spots 31a, 31b on the plane $O_4$ can be completely separated in the x-direction.

As described above, in this embodiment, the spherico-cylindrical lens 29 is provided and the photo-detector 30 is disposed at a predetermined position, so desired spots 31a and 31b are formed on the photo-detector and, as a result, the reproduced information signals and tracking signal can be stably obtained.

3. Detecting of Defocus Signal

As shown in FIG. 1, the beam 4 separated by the beam splitter 3 is reflected by the beam splitter 17 and then is directed to the disc 9 together with the beam 5 along the optical path separated from the optical axis of the beam 5. The reflected beam 34 from the recorded surface 10 is detected by the photo-detector 35 comprising two elements for the focus servo-control.

The focus servo-control is necessary to compensate for a change in the position or size of the beam spots on the video disc which is caused by the fluctuation in the position of the surface of the disc with respect to the objective lens 13. The light beam for the focus servo-control and the light beam for reading the information signals are separately incident on the surface of the disc. According to this embodiment, the focus servo-control is very easily and effectively operated using the combination of the beam splitter 3 and the optical coupler 18 as already described.

In order to effect the focus servo-control, it is necessary for the beam to be incident on the disc along the optical path distant from the optical axis of the objective lens. This principle will be now briefly explained with reference to FIG. 9.

When the disc 9 does not fluctuate, the beam 4 passes through the objective lens 13 along the optical path distant from the optical axis 37 of the objective lens 13 to form a spot on the disc 9 and reflected thereon. The reflected beam 34 modulated by the signal record surface of the disc 9 is incident on each of elements 35a and 35b of the photo-detector 35 through the objective lens 13 to form the spot 36 thereon extending over the elements 35a and 35b.

Figure 9:
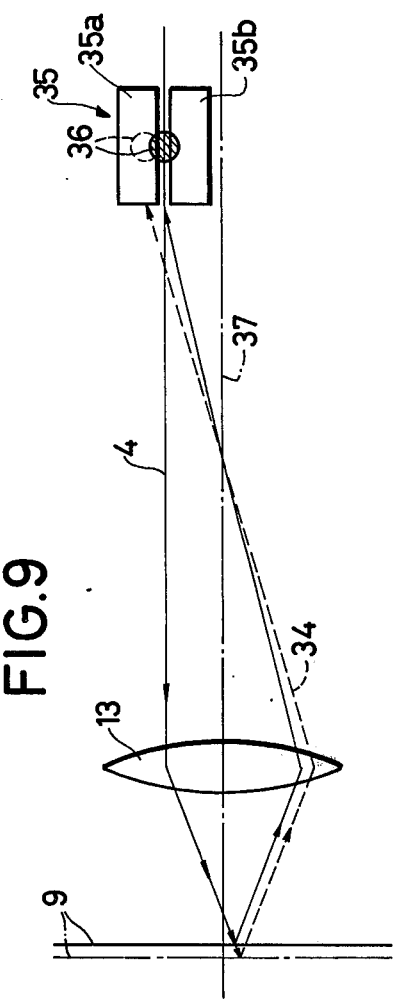
FIG. 9 is a diagram for explaining the operation of the focussing control servo of the present invention.

When the disc 9 is displaced from the normal position to a position shown by a dot-dash line in FIG. 9, the beam 4 forms a defocussed spot on the displaced disc and is reflected therefrom, and the reflected beam 34 is incident on the objective lens 13 along a dotted line in FIG. 9. The reflected beam 34 is refracted by the lens 13 at the position more distant from the optical axis 37 than the original path of the reflected beam, so that the refraction angle of the beam 34 is larger than that of the beam incident on the undisplaced disc, and the element 35a receives a higher proportion the beam 34. The beam spot 36 is thus formed as shown by a phantom line circle in FIG. 9. When the disc 9 is displaced from the normal position in the opposite direction, the another element 35b receives a higher proportion of the reflected beam than the element 35a. Consequently, the amount and direction of the displacement of the disc 9 from the normal position can be detected by the comparison between the amount of the light received by the element 35a and the amount of the light received by the element 35b.

When the lens 13 is moved by a driving coil or the like in accordance with the detected displacement of the disc 9, the spot of the beam 5 for reading the information signals can be correctly focussed on the disc 9 regardless of the displacement of the disc 9. The relation between information signal record tracks on the disc 9 and the spots of the beams is shown in FIG. 10. According to FIG. 10, the spot 32 of the beam for the focus servo-control is formed at a position separated somewhat from the spot 21a for reading the information signals in the radial direction of the disc 9 (the y-direction along the record track 39), the record track having rows of pits 38 formed substantially parallel to each other. The pitch of the record tracks 39 is about 2 microns and a diameter of the spot 32 is about 6 microns. The reason the spot 32 has such a large diameter is that the focus servo-control beam is otherwise amplitude-modulated by the pits on the video disc so that the detected displacement of the disc cannot be discriminated from the detected tracking deviation. Accordingly, the spot of the focus servo-control beam is formed extending over a plurality of, for example, three or four record tracks with the larger diameter than those of the tracking servo-control beams. In such a situation the reflected beam of the focus servo-control beam is detected, whereby the modulations by the tracking servo-control can be averaged and only the displacement of the disc, and thereby defocussing of the beam is detected.

The beam 4 for detecting the defocussing is operated by TBC mirror 20 in the the incident and reflected path portions thereof and forms the spot on the plane $O_2$ in the recorded surface 10 and further forms the spot on the photo-detector 35 disposed at the plane $O_5$ conjugate with the plane $O_2$ with regard to the lens 13. Since the beam 4 is operated on by the TBC mirror 20 on both the incident and reflected path portions therof, the spot on the plane $O_5$ is not influenced by the swinging of the TBC mirror 20 and is fixed in the x-direction. On the other hand, the spot 32 of the beam 4 formed on the recorded surface 10 is subject to the time base correction in the x-direction by the TBC mirror 20, as shown in FIG. 3. However, the direction in which the beam 4 is distant from the optical axis 37 is the radial direction of the disc 9 or the y-direction orthogonal to the direction of the swinging of the TBC mirror 20 (the x-direction), so that the distance between the beam 4 and the optical axis 37 does not vary. Because the beam 4 is not operated on by the tracking mirror 7 either in the incident path portion or in the reflected path portion thereof, the beam 4 is not influenced by the swinging of the tracking mirror 7.

As is apparent from the above description, the beam 4 can be used for detecting the defocussing of the beam independently of the beam for reading the information signals and the beam for the tracking servo-control, and the focus servo-control can be operated without undesirable and adverse influence from the swinging of the TBC mirror 20 and the tracking mirror 7.

Although one embodiment of this invention has been described in detail, the present invention is not limited to a single embodiment. Various possible modifications are apparent to those skilled in the art without departing from the spirit and scope of this invention.

For example, the lens 8 may be omitted in FIG. 1 and an aperture may be disposed near the knife-edged mirror 14 to decrease the diameter of the beam 5. The variations of the optical system and the optical paths of the beams are also possible.

What is claimed is:

1. In an apparatus for optically reproducing information signals recorded in a record track on a record medium surface, which apparatus comprises light source means providing light beams for scanning along said track so as to read the information signals recorded therein and for tracking the scanning of the record track by the reading light beam, respectively, means directing said light beams in respective optical paths having portions incident on said record medium surface and portions reflected from said surface, objective lens means interposed in said optical paths for acting on said light beams in the incident and reflected portions of said paths, signal deflecting means responsive to the reading light beam in said reflected portion of its optical path for reproducing the recorded signals in said record track in response to scanning of said reading light beam along the track, and tracking servo control means responsive to each tracking light beam in the reflected portion of its optical path for positioning said reading light beam traversely in respect to the direction along the record track so as to maintain said scanning of the track by said reading light beam; the improvement comprising time base correction mirror means interposed in said optical paths adjacent said objective lens means for acting on said light beams in both the incident and reflected portions of said paths, said time base correction mirror means being angularly displaceable for positioning said beams in said direction along the record track, and said tracking servo control means including tracking control mirror means interposed in said optical paths between said source and said time base correction mirror means for acting on said light beams only in said incident portions of the optical paths, said tracking control mirror means being angularly displaceable for said positioning of the reading light beam transversely in respect to the direction along the track.

2. The apparatus according to claim 1; further comprising second lens means interposed in said reflected portions of the optical paths and through which the light beams are incident on said signal detecting means, said second lens means and said signal detecting means being arranged to substantially satisfy the following relationships:

$$1/ax + 1/bx = 1/fx$$

$$1/ay + 1/bx = 1/fy$$

in which ax is the distance between said second lens means and a plane in which local points of said light beams are formed by said objective lens means in said reflected portions of the optical paths, bx is the distance between said second lens means and said signal detecting means, ay is the distance between said second lens means and a point on the optical axis of said second lens means at which said light beams in said reflected portions of the optical paths intersect said optical axis after passing through said objective lens means, fx is the focal length of said second lens means in the direction parallel to the direction along said track on said record medium, fy is the focal length of said second lens means in the direction orthogonal both to the optical axis of said second lens means and to said direction along the track, and fx and fy are different from each other.

3. The apparatus according to claim 2; wherein said second lens means has opposite surfaces which are respectively spherical and cylindrical, said cylindrical surface having an axis of rotation in the direction parallel to said direction along the track.

4. The apparatus according to claim 2; further comprising polarizing means between said source means and said tracking control mirror means, for polarizing said beams in one plane, means between said polarizing means and said time base correction mirror means for rotating the plane of polarization of said beams, and beam-splitter means located between said tracking control mirror means and said means for rotating the plane of polarization for selectively deflecting the beams reflected from record medium surface so that said selectively deflected beams are directed towards said signal detecting means.

5. The apparatus according to claim 1; further comprising polarizing means between said source means and said tracking control mirror means for polarizing said beams in one plane, means between said tracking control mirror and said time base correction mirror means for rotating the plane of polarization of said beams, and beam splitter means located between said tracking control mirror means and said means for rotating the plane of polarization for selectively deflecting the beams reflected from said record medium surface so that said beams are operated on by said tracking a control mirror means only on the incident portions of said paths.

6. The apparatus according to claim 5; wherein said means for rotating the plane of polarization includes a quarter-wave plate.

7. The apparatus according to claim 5; further comprising focussing servo control means including means for providing a focussing control beam having a plane of polarization perpendicular to said one plane and directed toward said beam-splitter means so that said focussing control beam is deflected by the letter through said means for rotating the plane of polarization and through said objective lens to be incident on said record medium.

8. The apparatus according to claim 7; wherein said means for providing a focussing control beam comprises a second polarizing beam-splitter passing said beams polarized in said one plane without deflection to said tracking control mirror means, and deflecting said focussing control beam towards the first mentioned beam-splitter means.

9. The apparatus according to claim 7; wherein said focussing control beam is separated from the optical paths of said reading and tracking light beams.

10. The apparatus according to claim 9; further comprising a knife-edge mirror positioned between said tracking control mirror means and said beam-splitter means to reflect said reading and tracking light beams in said incident portions of the respective optical paths and to permit undeflected passage therethrough of said focussing control beam reflected from said record medium.

11. The apparatus according to claim 10; further comprising a servo control photodiode for detecting deviations in said focussing control beam and being located along the path of said reflected focussing control beam beyond said knife-edge mirror in a plane conjugate with the plane of said record medium in respect to said objective lens means.

12. The apparatus according to claim 11; wherein said focussing control beam is separated from said paths of the reading and tracking light beams, and said servo control photodiode includes two elements separated from each other in said direction that said focussing control beam is separated from said optical paths of said reading and tracking light beams.

* * * * *